US006781342B2

(12) United States Patent
Tolbert, Jr. et al.

(10) Patent No.: US 6,781,342 B2
(45) Date of Patent: Aug. 24, 2004

(54) SYSTEM AND METHOD FOR SOFT STARTING A THREE PHASE MOTOR

(75) Inventors: John Willard Tolbert, Jr., Bristol, TN (US); David Turner Monk, Bristol, VA (US); Joseph Frank Loprete, Bristol, TN (US); Tyrone Scott Simerly, Johnson City, TN (US); Bradley Todd Arnold, Bluff City, TN (US)

(73) Assignee: Bristol Compressors, Inc., Bristol, VA (US)

( * ) Notice: Subject to any disclaimer, the term of this patent is extended or adjusted under 35 U.S.C. 154(b) by 0 days.

(21) Appl. No.: 10/444,833

(22) Filed: May 23, 2003

(65) Prior Publication Data

US 2003/0222609 A1 Dec. 4, 2003

Related U.S. Application Data

(60) Provisional application No. 60/383,912, filed on May 29, 2002.

(51) Int. Cl.[7] .................................................. H02P 7/40
(52) U.S. Cl. ..................... 318/784; 318/263; 318/785; 318/786; 318/256; 318/280; 318/283; 318/284
(58) Field of Search ................................ 318/263, 785, 318/786, 256, 280, 284

(56) References Cited

U.S. PATENT DOCUMENTS

| | | | |
|---|---|---|---|
| 3,573,530 A | 4/1971 | Shinozahi | 318/227 |
| 3,742,370 A | 6/1973 | Hansen | 318/227 |
| 4,057,842 A | 11/1977 | Bauman et al. | 361/93 |
| 4,236,874 A * | 12/1980 | Sisk | 417/315 |
| 4,361,793 A | 11/1982 | Nordell | 318/729 |
| 4,482,853 A | 11/1984 | Bhavsar | 318/778 |
| 4,510,422 A | 4/1985 | Ogura | 318/254 |
| 4,629,960 A | 12/1986 | Welsh et al. | 318/729 |
| 4,697,132 A | 9/1987 | Ronk et al. | 318/795 |
| 4,723,104 A | 2/1988 | Rohatyn | 318/813 |
| 4,726,738 A | 2/1988 | Nakamura et al. | 417/22 |
| 4,879,498 A | 11/1989 | Shinohara et al. | 318/254 |
| 5,376,866 A | 12/1994 | Erdman | 318/254 |
| 5,627,738 A | 5/1997 | Lubomirsky et al. | 363/49 |
| 5,801,500 A | 9/1998 | Jensen et al. | 318/254 |
| 5,859,514 A | 1/1999 | Chouffier et al. | 318/432 |
| 5,883,486 A * | 3/1999 | Earhart et al. | 318/778 |
| 6,132,177 A | 10/2000 | Loprete et al. | 417/221 |
| 6,290,043 B1 * | 9/2001 | Ginder et al. | 192/21.5 |
| 6,407,530 B1 * | 6/2002 | Kwon et al. | 318/778 |

FOREIGN PATENT DOCUMENTS

| | | |
|---|---|---|
| DE | 592059 | 2/1934 |
| DE | 1 415 980 | 1/1969 |
| DE | 35 29 039 A1 | 2/1987 |
| DE | 195 09 365 A1 | 10/1996 |
| DE | 196 35 597 C1 | 1/1998 |
| DE | 100 03 692 A1 | 8/2001 |
| EP | 0 031 688 A3 | 7/1981 |
| GB | 773135 | 4/1957 |
| GB | 2 212 348 A | 7/1989 |

* cited by examiner

Primary Examiner—Rita Leykin
(74) Attorney, Agent, or Firm—Brian T. Sattizahn; McNees Wallace & Nurick LLC

(57) ABSTRACT

A three phase motor starting system is provided to reduce the in-rush current to the motor in order to obtain a soft start of the motor. The soft start of the motor equates to reduced impact forces on motor parts and device components connected to the motor during startup of the motor, especially a startup resulting from a reversal of the direction of rotation of the motor. The system uses an impedance load in series with the motor windings of the motor to reduce the in-rush current to the motor windings, which results in a reduced acceleration of the motor shaft and a soft start to the motor. The impedance loads used by the system can be a resistive load, a capacitive load or an inductive load, depending on the type of impedance load that is desired for the soft start of the motor.

33 Claims, 8 Drawing Sheets

SYSTEM AND METHOD FOR SOFT STARTING A THREE PHASE MOTOR

CROSS REFERENCE TO RELATED APPLICATIONS

This application claims the benefit of U.S. Provisional Application No. 60/383,912, filed May 29, 2002.

FIELD OF THE INVENTION

The present invention relates generally to a system and method for starting a three phase motor. More specifically, the present invention relates to a system and method for soft starting a three phase motor by reducing the amount of in-rush current to the motor by using an impedance load, such as a power resistor.

BACKGROUND OF THE INVENTION

At startup, a three phase motor frequently has a high starting torque on the shaft. This high starting torque can damage parts of the motor and other mechanisms connected to the shaft that are subjected to a load during the startup process. For example, a single phase motor can have a first acceleration of the shaft at startup to obtain the operating speed of the motor, while a three phase motor can have a second, higher, acceleration of the shaft at startup to obtain the operating speed of the motor. This dramatic difference in accelerations correlates to higher torque, up to ten times more torque, for a three phase motor and corresponding greater forces on the motor and mechanisms connected to the shaft. In addition to the high starting torque, the startup of a three phase motor also involves a large in-rush or surge of current to the motor. The in-rush of current to the motor can damage the electrical components of the motor and/or system, pose a safety risk for users and cause a drain on the corresponding power grid of the motor.

One example of the use of a three phase motor is in a compressor of a heating, ventilation and air conditioning (HVAC) system. The three phase motor can be used in a single capacity compressor or a multi-capacity compressor. The multi-capacity compressor can have mechanisms or components that are connected to the shaft that impact a stop block during the startup of the motor. Additionally, in some multi-capacity compressors, the different compressor capacity is obtained by reversing the direction of rotation of the shaft of the motor. In other words, rotating the shaft in the opposite direction in some multi-capacity compressors can result in a different compressor capacity. Upon the shaft reversing direction, which involves the rotating shaft of the motor being stopped and then rotated in the opposite direction, the components or mechanism connected to the shaft can impact stop blocks similar to that described above. The impact of the components or mechanism rotating at a high shaft speed on the stop blocks during startup of the motor can damage the components or mechanisms and reduce the useful life of the compressor.

To limit in-rush currents and reduce the starting torque shaft of a three phase motor, a soft starter can be used with the motor. In many regions of the world, electrical codes require the use of soft starters on HVAC systems to limit in-rush current for single and three-phase applications. There are a variety of different devices or systems that can be used to implement a soft starter for a three phase motor. Some of these devices and systems used in a soft starter can include positive and negative temperature coefficient resistors, semiconductors and solid state electronics. These types of soft starters involve complicated electrical circuits and control programs that can be difficult to install and costly to use.

Therefore, what is needed is a simple and cost-effective system and method for soft starting a three phase motor that can reduce the initial acceleration and torque of the motor to limit the impact load on components of a multi-capacity compressor and that can reduce the in-rush current to the motor.

SUMMARY OF THE INVENTION

One embodiment of the present invention is directed to a three phase motor for a multi-capacity compressor having a first capacity in response to a first direction of rotation of the motor and a second capacity greater than the first capacity in response to a second direction of rotation of the motor. The motor includes a plurality of windings and a circuit configured to provide an electrical connection between the plurality of windings and a plurality of input lines of a three phase power supply. The circuit having at least one impedance load connected in series with each winding of the plurality of windings upon startup of the three phase motor. The at least one impedance load connected in series with each winding is configured to receive power from an input line of a three phase power supply. The at least one impedance load connected in series with each winding is configured to provide a first amount of current to a corresponding winding of the plurality of windings. The circuit also has switching means. The switching means is configured and disposed to shunt out or remove the at least one impedance load connected in series with each winding for normal operation of the three phase motor upon expiration of a predetermined time period from startup of the three phase motor. The switching means is configured to provide a second amount of current to the plurality of windings.

The circuit further includes rotation control means. The rotation control means is configured and disposed to control the direction of rotation of the motor. The rotation control means has a first configuration to generate the first direction of rotation in the motor and a second configuration to generate the second direction of rotation in the motor. The rotation control means is switchable between the first configuration and the second configuration prior to startup of the three phase motor. The three phase motor further includes a shaft. The shaft is configured to have a first acceleration in response to the first amount of current being provided to the plurality of windings and a second acceleration greater than the first acceleration in response to a second amount of current being provided to the plurality of windings. The first acceleration of the shaft generates a reduced stop impact force on compressor components connected to the shaft during startup of the three phase motor over the second acceleration of the shaft. The stop impact force is generated from the impact of compressor components against a corresponding stop of a multi-capacity compressor as a result of rotation of the shaft.

Another embodiment of the present invention is directed to a method of starting a multi-capacity compressor to reduce impact forces on compressor components. The multi-capacity compressor has a first capacity in response to a first direction of rotation of a compressor motor and a second capacity greater than the first capacity in response to a second direction of rotation of the compressor motor. The method includes the steps of connecting at least one impedance load to at least one winding of the compressor motor using a first electrical path. The at least one impedance load is configured to provide a first amount of current to the at least one winding. The method further includes the step of accelerating a shaft of the multi-capacity compressor to a first speed of rotation corresponding to the first amount of current provided to the at least one winding.

Next, a second electrical path is provided to the at least one winding of the compressor motor. The second electrical path is configured to provide a second amount of current greater than the first amount of current to the at least one winding of the compressor motor. The method also includes the steps of switching from the first electrical path to the second electrical path after a predetermined time period has elapsed and accelerating the shaft of the compressor motor to a second speed of rotation corresponding to the second amount of current provided to the at least one winding. The acceleration of the shaft to the first speed of rotation generating a reduced stop impact force on compressor components connected to the shaft over the acceleration of the shaft to the second speed of rotation, the stop impact force resulting from compressor components impacting a corresponding stop provided on the shaft A further embodiment of the present invention is directed to a multi-capacity compressor having a first operating capacity and a second operating capacity. The second operating capacity is greater than the first operating capacity. The multi-capacity compressor includes a three phase motor. The three phase motor has a first direction of rotation and a second direction of rotation opposite to the first direction of rotation. The first direction of rotation of the three phase motor generates the first operating capacity in the multi-capacity compressor and the second direction of rotation of the three phase motor generates the second operating capacity in the multi-capacity compressor. The three phase motor also has a plurality of windings. The compressor also has a shaft connected to the three phase motor, which has a first direction of rotation corresponding to the first direction of rotation of the three phase motor and a second direction of rotation corresponding to the second direction of rotation of the three phase motor. The compressor further includes a plurality of eccentric crankpins disposed on the shaft. Each eccentric crankpin is configured and disposed to drive an associated piston.

The compressor additionally includes at least one stop mechanism disposed on the shaft. The at least one stop mechanism is disposed adjacent to an eccentric crankpin of the plurality of eccentric crankpins. Furthermore, the compressor includes an eccentric cam disposed about an eccentric crankpin of the plurality of eccentric crankpins. The eccentric cam has at least one dog configured and disposed to contact said at least one stop mechanism. The eccentric cam and at least one dog have a first position with respect to the at least one stop mechanism in response to the first direction of rotation of the shaft and a second position with respect to the at least one stop mechanism different from the first position in response to the second direction of rotation of the shaft.

A circuit is configured to provide an electrical connection between the plurality of windings and a plurality of input lines of a three phase power supply. The circuit includes at least one impedance load connected in series with each winding of the plurality of windings upon startup of the three phase motor. The at least one impedance load connected in series with each winding being configured to receive power from an input line of a three phase power supply. The at least one impedance load connected in series with each winding is configured to provide a first amount of current to a corresponding winding of the plurality of windings. The circuit also includes a switching mechanism. The switching mechanism is configured and disposed to shunt out or remove the at least one impedance load connected in series with each winding for regular operation of the three phase motor upon expiration of a predetermined time period. The switching mechanism provides a second amount of current to the plurality of windings.

The circuit further includes a rotation control mechanism configured and disposed to control the direction of rotation of the motor. The rotation control mechanism has a first configuration to generate the first direction of rotation in the three phase motor and a second configuration to generate the second direction of rotation in the three phase motor. The rotation control mechanism is switchable between the first configuration and the second configuration. The shaft has a first acceleration during startup of the three phase motor in response to a first amount of current being provided to the plurality of windings and a second acceleration greater than the first acceleration during regular operation of the three phase motor in response to a second amount of current being provided to the plurality of windings. The first acceleration of the shaft generates a reduced stop impact force upon the at least one dog contacting the corresponding at least one stop mechanism in response to a change in the direction of rotation of the three phase motor over the second acceleration of the shaft.

One advantage of the present invention is that a lower starting acceleration of a motor for a compressor is obtained, which reduces the impact force on components of the compressor thereby extending the life of the compressor and permitting a less expensive compressor mechanical.

Another advantage of the present invention is that the in-rush current to the motor is reduced, which can result in energy savings and a more stable power grid.

A further advantage of the present invention is that it can be used on single capacity compressors, in addition to multi-capacity compressors, that are subject to load conditions during startup of the motor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
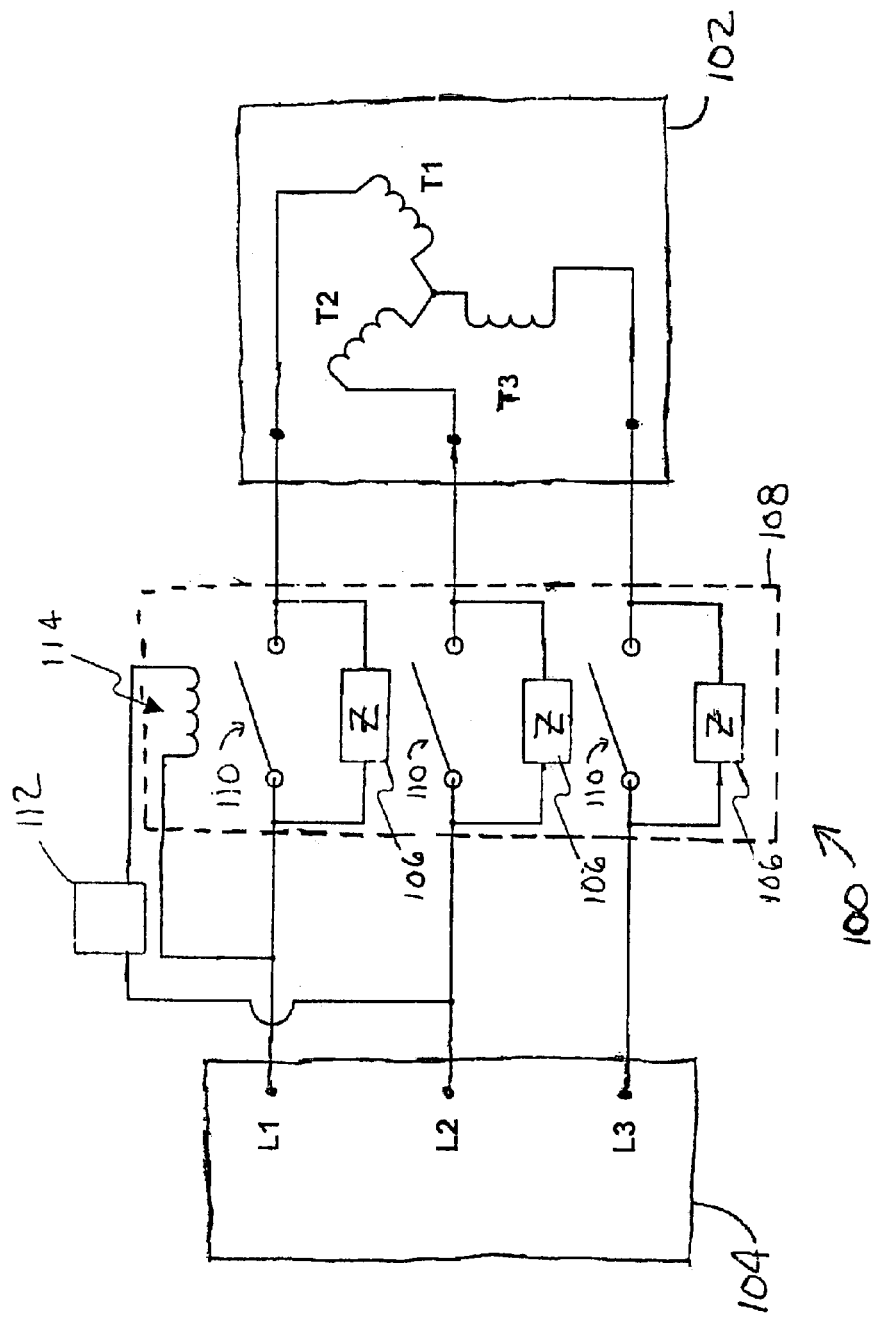
FIG. 1 is a circuit diagram of a first embodiment of the present invention for soft starting a three-phase motor.

FIG. 1 illustrates one embodiment of the present invention for soft starting a three phase motor. A starting circuit 100 is connected between a motor 102 and a three phase power supply 104. The three phase power supply 104 has three input lines L1–L3 which are connected by the starting circuit 100 to three starting windings T1–T3 on the motor 102. The starting windings T1–T3 for the motor can be either in a wye ("Y") configuration, as shown in FIG. 1, or in any other acceptable starting configuration including other symmetrical configurations, e.g. a delta configuration, and non-symmetrical configurations, e.g. a Scott-T configuration. The starting circuit 100 is configured to provide a connection between each input line L1–L3 and motor winding T1–T3. For example, the starting circuit 100 shown in FIG. 1 provides a connection between input line L1 and motor winding T1, input line L2 and motor winding T2, and input line L3 and motor winding T3. However, it is to be understood that any similar connection arrangement of input lines L1–L3 and motor windings T1–T3 can be used for starting circuit 100.

In starting circuit 100, an impedance load 106 is connected in series between each input line L1–L3 and motor winding T1–T3. The impedance load 106 is preferably a resistive load, such as power resistor, however the impedance load 106 can also be a reactive load, e.g. an inductive load or a capacitive load. In one embodiment of the present invention, a resistive load rated at about 10 Ohms, 50 Watts and 400 Joules or a reactive load of about 5 Ohms can be used for impedance load 106.

During a starting operation or startup of motor 102, the impedance load 106 is used to reduce the amount of in-rush current that is received by the motor windings T1–T3, thereby providing a soft start for the motor and a reduction in the current demand during the starting of the motor 102. The reduction in in-rush current to the motor 102 also reduces the acceleration of the shaft (and the corresponding shaft rotational speed accelerated to by the motor 102) and thus reduces the corresponding torque on the motor shaft. This reduction in the initial acceleration and torque correlates to a reduction in impact forces for the operating parts of the motor 102 and connected components and mechanisms of a motor driven device, such as when the components or parts impact a stop block. The motor driven device is preferably either a single capacity or multi-capacity compressor, however the motor driven device can be any type of device that is driven by a motor.

After a predetermined time period, a contactor or switching device 108, such as a three pole contactor or three single pole relays, is activated to close a series of contacts or switches 110 that are connected in parallel to the impedance loads 106. The closing of the switches 110 of switching device 108 shunts out the impedance loads 106 and permits the motor 102 to receive full line power from input lines L1–L3. Upon receiving full line power, the motor 102 accelerates at a greater rate than during startup to full speed or normal operating speed and begins regular operation. A timing device 112 is programmed to energize the activation coil 114 of the switching device 108 to close switches or contacts 110 after the predetermined time period has expired. Any device, such as a precision "delay on make" timer, that can energize the activation coil 114 after a predetermined time period has expired can be used for the timing device 112. The predetermined time period is determined based on the operational characteristics of the motor 102 and the motor driven device and any other relevant considerations. For example, the predetermined time can be based on the time that is needed to rotate any components connected to the shaft into position (e.g. against a stop block) and bring the shaft up to speed. In addition, the predetermined time period can be based on the delay time necessary to minimize the power dissipation in impedance elements 106. In one embodiment of the present invention, the predetermined time period is in the range of 100–300 mS, however it is to be understood that any adequate time period can be used.

In another embodiment of the present invention, the impedance loads 106 and switching device 108 of starting circuit 100 can be connected or used with less than all of the input lines L1–L3 and motor windings T1–T3. For example, an impedance load 106 may be connected in series with only motor winding T3 and the switching device 108 may be provided to only shunt out impedance load 106 for motor winding T3.

Figure 2:
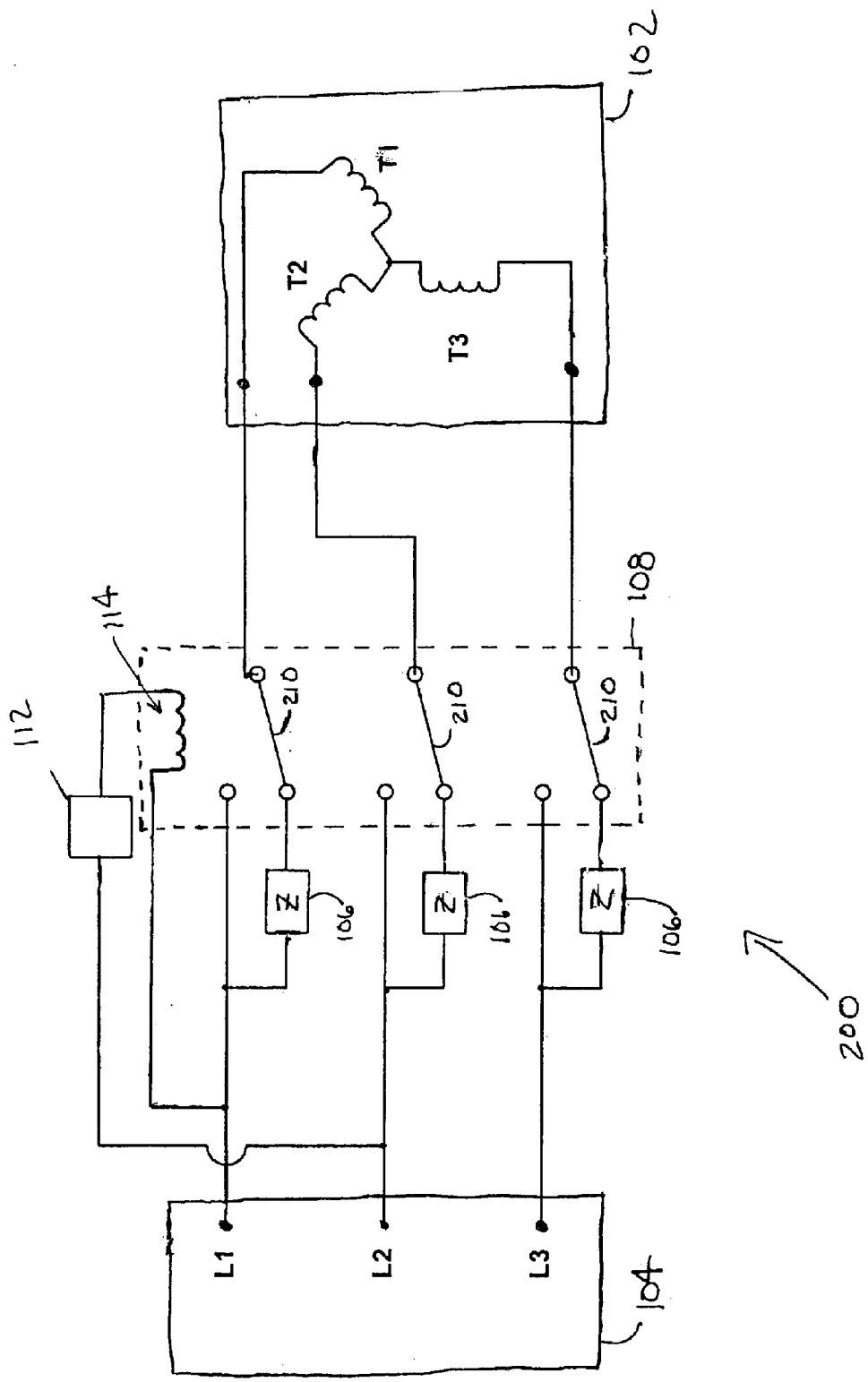
FIG. 2 is a circuit diagram of a second embodiment of the present invention for soft starting a three-phase motor.

FIG. 2 illustrates an embodiment of the present invention for soft starting a three phase motor. A starting circuit 200 provides a connection between the input lines L1–L3 and the motor windings T1–T3, similar to starting circuit 100. However, instead of connecting the switches 110 in parallel with the impedance loads 106 as in starting circuit 100, single pole double throw (SPDT) switches 210 are connected in series with the impedance loads 106. On start-up, the SPDT switches 210 are in a first position that connects the impedance loads 106 in series with motor windings T1–T3. Then, after the predetermined time period has expired, the timing device 112 energizes the activation coil 114 to switch the SPDT switches 210 into a second position that removes the impedance load 106 from the starting circuit 200 and permits full line power to flow to the motor windings T1–T3. While SPDT switches 210 have been described above for starting circuit 200, it is to be understood that any type of switching device that can switch between electrical paths can be used.

In another embodiment of the present invention, the impedance loads 106 and switching device 108 of starting circuit 200 can be connected or used with less than all of the input lines L1–L3 and motor windings T1–T3. For example, an impedance load 106 may be connected in series with only motor winding T3 and the switching device 108 may be provided to only remove impedance load 106 for motor winding T3.

Figure 3:
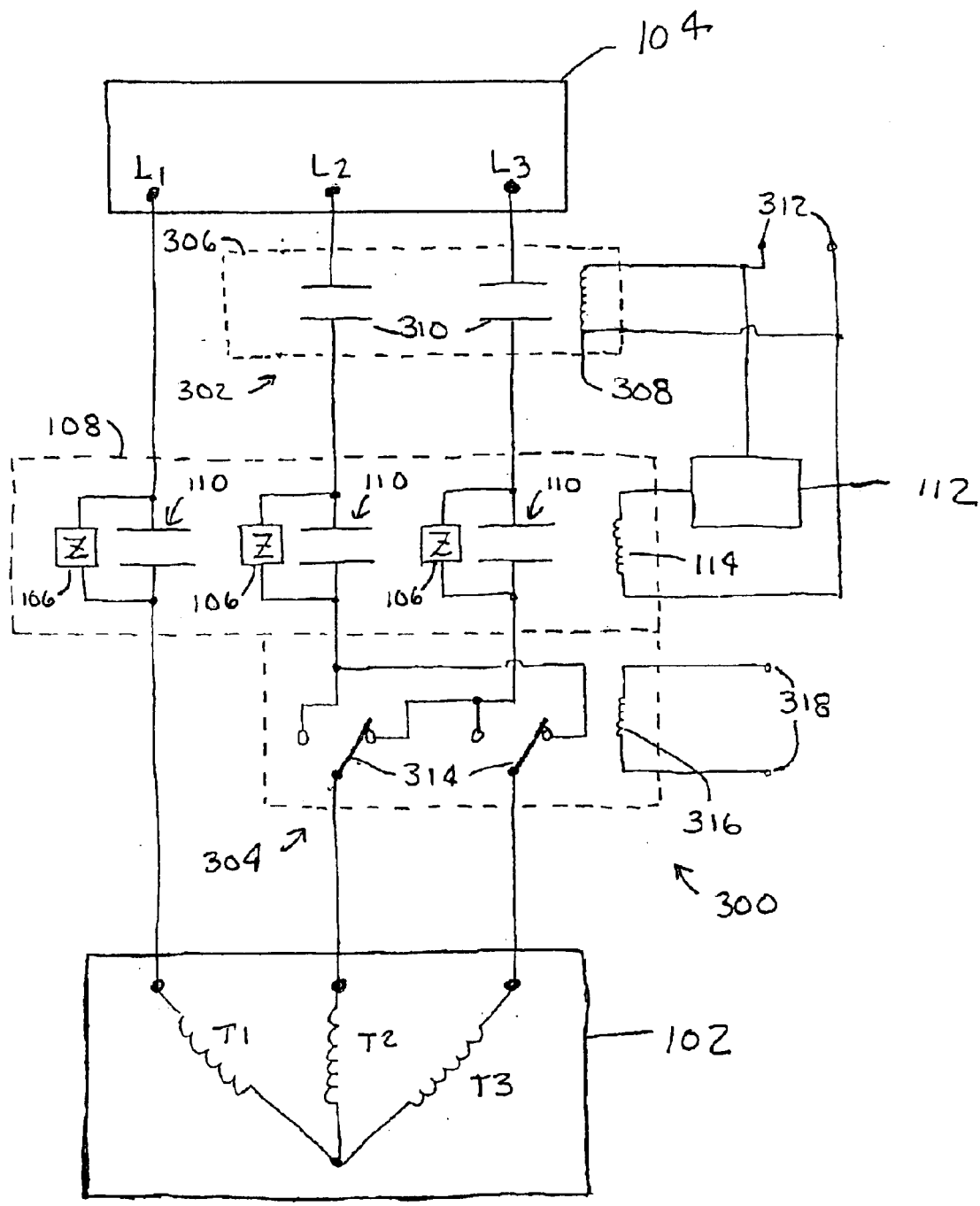
FIG. 3 is a circuit diagram of a third embodiment of the present invention for soft starting a three-phase motor.

FIG. 3 illustrates an embodiment of the present invention for soft starting a three phase motor. Starting circuit 300 provides a reduced in-rush current to motor 102 similar to starting circuit 100 from FIG. 1. However, starting circuit 300 also has a motor operation circuit 302 for controlling operation of the motor and/or motor driven device and a motor rotation control circuit 304 for reversing the direction of rotation of the motor shaft. The motor rotation control circuit 304 is preferably used with a motor for a dual or multi-capacity compressor to change the capacity of the multi-capacity compressor by reversing the direction of the motor shaft.

Figure 7:
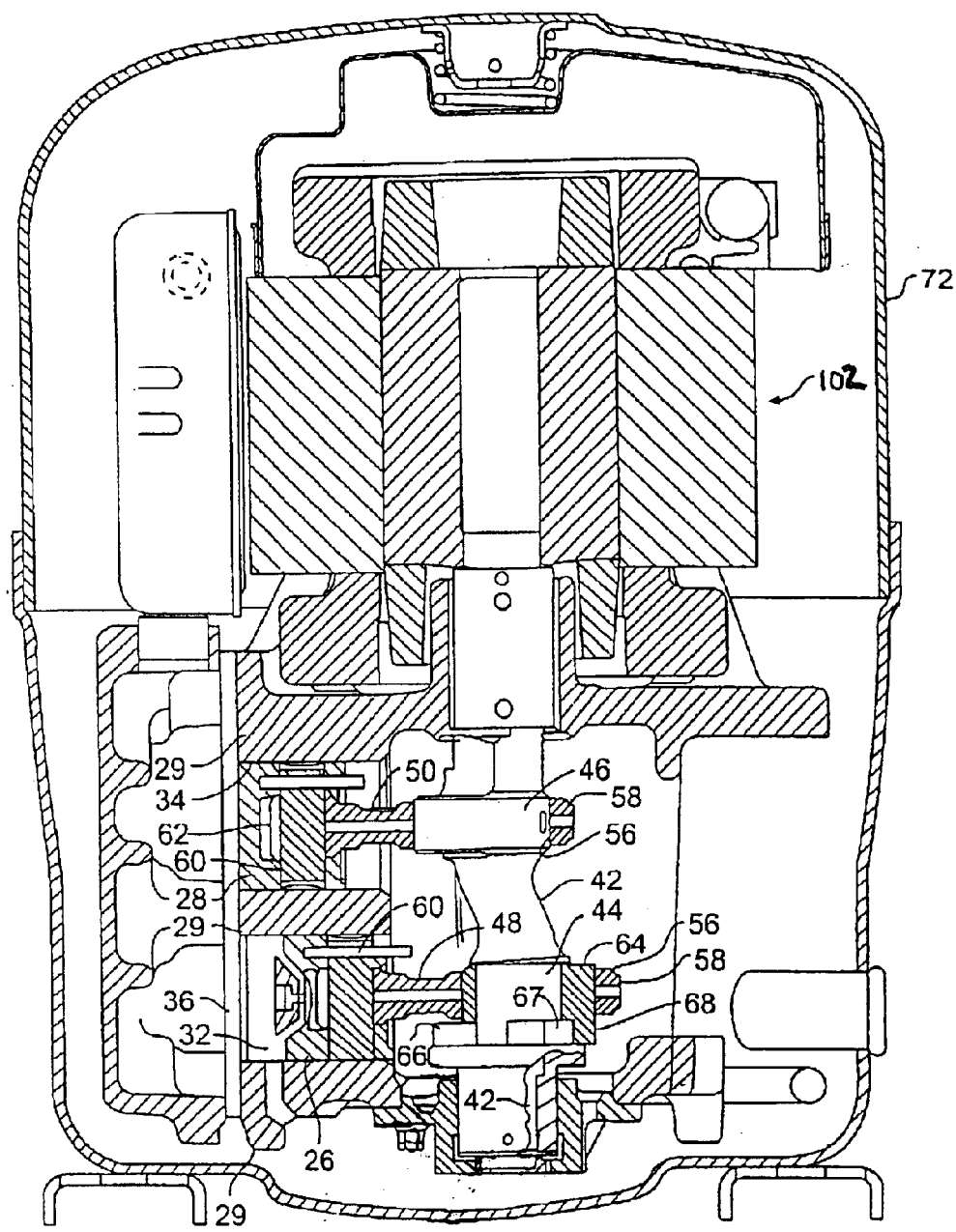
FIG. 7 is a longitudinal, vertical cross-sectional view of a multi-capacity compressor showing the cam in a first orientation, with portions shown in relief for purposes of clarity.
Figure 8:
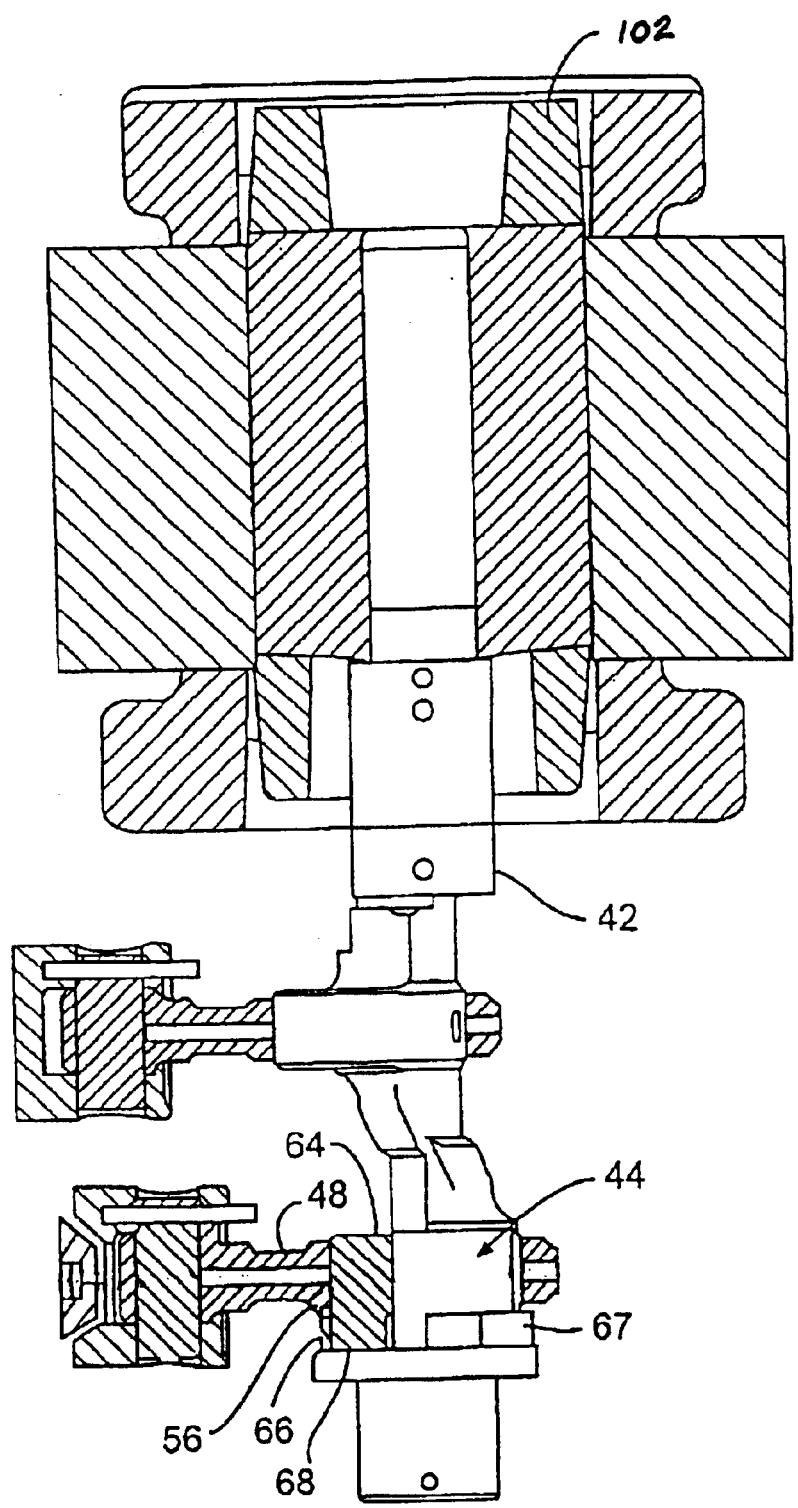
FIG. 8 is a cross-sectional view of the motor and crankshaft of FIG. 7 showing the cam in a second orientation.

FIGS. 7 and 8 illustrate one example of a multi-capacity compressor. This type of multi-capacity compressor has dual in-line pistons 26, 28. The compressor includes a cylinder block 29 formed with cylinders 32, 34 in which pistons 26, 28 respectively are reciprocally mounted. The compressor includes a valve plate 36 in which a suction valve and a discharge valve typically are provided. It is noted however, that where the suction valve is mounted in the piston head, no suction valve is needed in the valve plate.

A crankshaft 42 is rotatably mounted on block 29 and is provided with crankpin shafts or eccentrics 44, 46. Connecting rods 48, 50 are each provided with a bearing 56 on one end portion 58, and with a wrist pin 60 on the opposite end portion 62. An eccentric cam 64 is rotatably mounted on at least one of said crankpins, and one of said bearings 56 is rotatably mounted on the cam 64. Drive stops 66 and 67 are provided on the crankshaft 42 at predesigned and predetermined angular positions thereon, and one driven dog 68 is provided on the cam 64 at a predesigned and predetermined angular position thereon.

The drive stops 66 and 67 and driven dog 68 define the angular limits or end points of rotatability of the cam 64 on the crankshaft 42. In a different embodiment of the present invention, two dogs can be provided with one stop positioned therebetween.

The reversible motor 102 can be positioned within a compressor shell 72 to drive the crankshaft 42 selectively in either rotational direction in accordance with operational electrical signals transmitted thereto and the motor rotation control circuit 304. The cam 64 is responsively rotatable to one said end point, i.e. the driven dog 68 contacting a drive stop, upon rotation of said crankshaft 42 in one direction and to the other end point, i.e. the driven dog 68 contacting the other drive stop, upon rotation of said crankshaft 42 in the reverse or opposite direction.

FIG. 7 shows the cam 64 in an active mode orientation, thereby producing full throw of the crankpin and providing compression with the associated piston 26 for full capacity operation of the compressor. FIG. 8 shows the cam 64 in a passive mode orientation wherein the apex of cam 64 is proximal to its associated piston 26, thereby producing a zero crankpin throw and providing no compression in cylinder 32 during this orientation resulting in reduced capacity operation of the compressor. Additional details regarding the operation of this type of compressor can be found in U.S. Pat. No. 6,132,177, which is hereby incorporated by reference in its entirety.

In multi-capacity compressors, such as the one in FIGS. 7 and 8 where different capacities are obtained by reversing the direction of rotation of the motor shaft and crankshaft 42, starting circuit 300 provides a soft start and corresponding reduced acceleration and torque for the motor shaft and crankshaft 42 to thereby reduce impact damage on connected motor parts and compressor components and mechanisms, e.g. driven dog 68 of cam 64, resulting from impacts against drive stops 66 and 67 during a change in the direction of rotation of the motor shaft and crankshaft 42 to obtain the different capacities.

Referring back to FIG. 3, the motor operation circuit 302 includes a contactor or switching device 306 having an activation coil 308 to open and close switches or contacts 310 on at least two of the three input lines. When the motor 102 is not in operation, switches or contacts 310 are in the open position, preventing current from flowing through at least two lines of starting circuit 300. To begin operation of the motor 102, a motor operation control or signal is provided to terminals 312. The receipt of a control or signal at terminals 312 activates or energizes the activation coil 308 to close the switches 310. Similarly, to stop operation of the motor 102, a second motor operation control or signal is provided to terminals 312 to cause the activation coil 308 to open switches 310.

The closing of switches 310 permits current to flow through impedance loads 106, as described above, reducing the current to the motor 102 and thereby providing a soft start of the motor 102. In addition to energizing the activation coil 308, the motor operation control or signal received at terminals 312 also activates the timing device 112 to begin counting for the predetermined time period. After the predetermined time period has expired, the timing device 112 energizes activation coil 114 to close switches or contacts 110 in order to shunt out the impedance loads 106 and permit the motor 102 to receive full line power.

The motor rotation control circuit 304 includes a double pole double throw (DPDT) switch 314 or any other suitable switching arrangement controlled by an activation coil 316. The DPDT switch 314 is used to connect to two windings of the motor 102 to two input lines of the three phase power supply 104. In FIG. 3, input lines L2 and L3 are connected to motor windings T2 and T3 by starting circuit 300. However, it is to be understood that any two motor windings and input lines can be connected so long as the motor windings and input lines correspond to the same ones incorporated into motor operation circuit 302.

When the DPDT switch 314 is in a first position, a first input line is connected to a first motor terminal and the second input line is connected to the second motor terminal. For example, as shown in FIG. 3, input line L2 is connected to motor winding T3 and input line L3 is connected to motor winding T2 when the DPDT switch 314 is in the first position. In the second position, DPDT switch 314 connects the first input line to the second motor terminal and connects the second input line to the first motor terminal. In the above example from FIG. 3, the second position of DPDT switch 314 would have the input line L2 connected to motor winding T2 and input line L3 connected to motor winding T3. The changing of the position of DPDT switch 314 is used to change the direction of rotation of the motor shaft by altering the direction of the phase of the current received by the motor windings. As discussed above, the changing of the direction of rotation of the motor shaft is used to obtain different capacities in certain multi-capacity compressors. To change the position of DPDT switch 314, a motor rotation control signal is received at terminals 318 to energize the activation coil 316 to switch the poles of the DPDT switch 314 to the appropriate position for the desired direction of rotation and compressor capacity. Similarly, the rotation control signal can be removed or a second motor rotation control signal can be applied to terminals 318 to switch the DPDT switch 314 back to its prior position.

Figure 4:
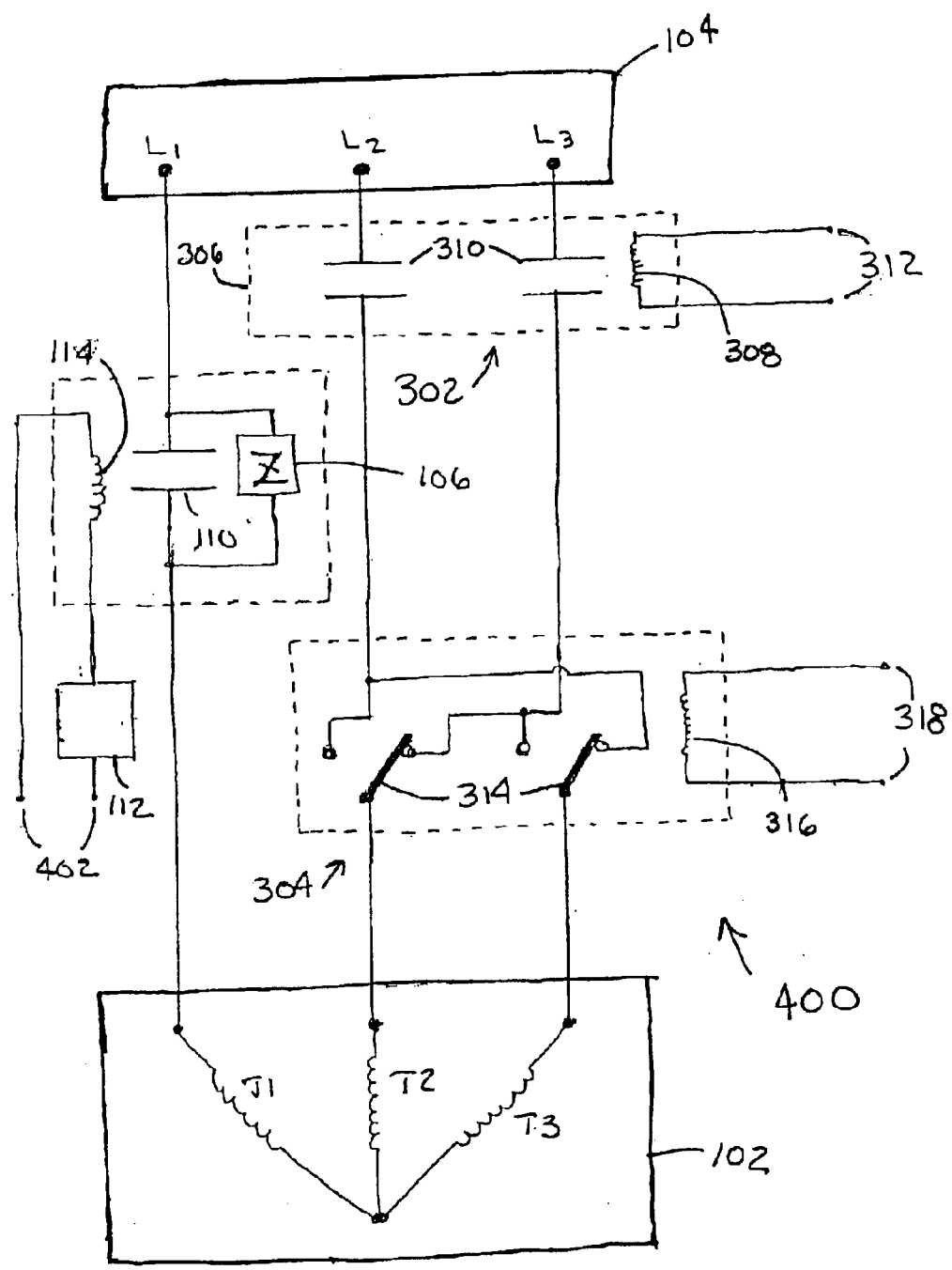
FIG. 4 is a circuit diagram of a fourth embodiment of the present invention for soft starting a three-phase motor.

FIG. 4 illustrates an embodiment of the present invention for soft starting a three phase motor. Starting circuit 400 provides a reduced in-rush current to motor 102 and is similar to starting circuit 300 from FIG. 3. However, starting circuit 400 only has an impedance load 106 connected in series between one input line and the motor windings. The other two input lines do not have impedance loads 106 connected thereto. In FIG. 4, impedance load 106 is connected in series with winding T1, while motor windings T2 and T3 do not have an impedance load connected thereto. Motor rotation control circuit 304 changes the direction of rotation of the motor shaft as described above with respect to FIG. 3. The motor operation circuit 302 is used to start and stop the motor 102 and motor driven device as described above with respect to FIG. 3. On the startup of motor 102, a reduced in-rush current is provided to the motor 102 by impedance load 106 connected in series with the motor winding T1. As discussed above, when a motor operation signal is received at terminals 312 and 402, switches 310 are closed and timing device 112 begins counting the predetermined time period. After the predetermined time period has expired, timing device 112 energizes activation coil 114 to close switch or contact 110 and shunt out impedance load 106 for motor winding T1, thereby permitting full line power to be received by motor 102. Alternatively, switch or contact 110 can be used to remove or disconnect impedance load 106 from the starting circuit 400.

Figure 5:
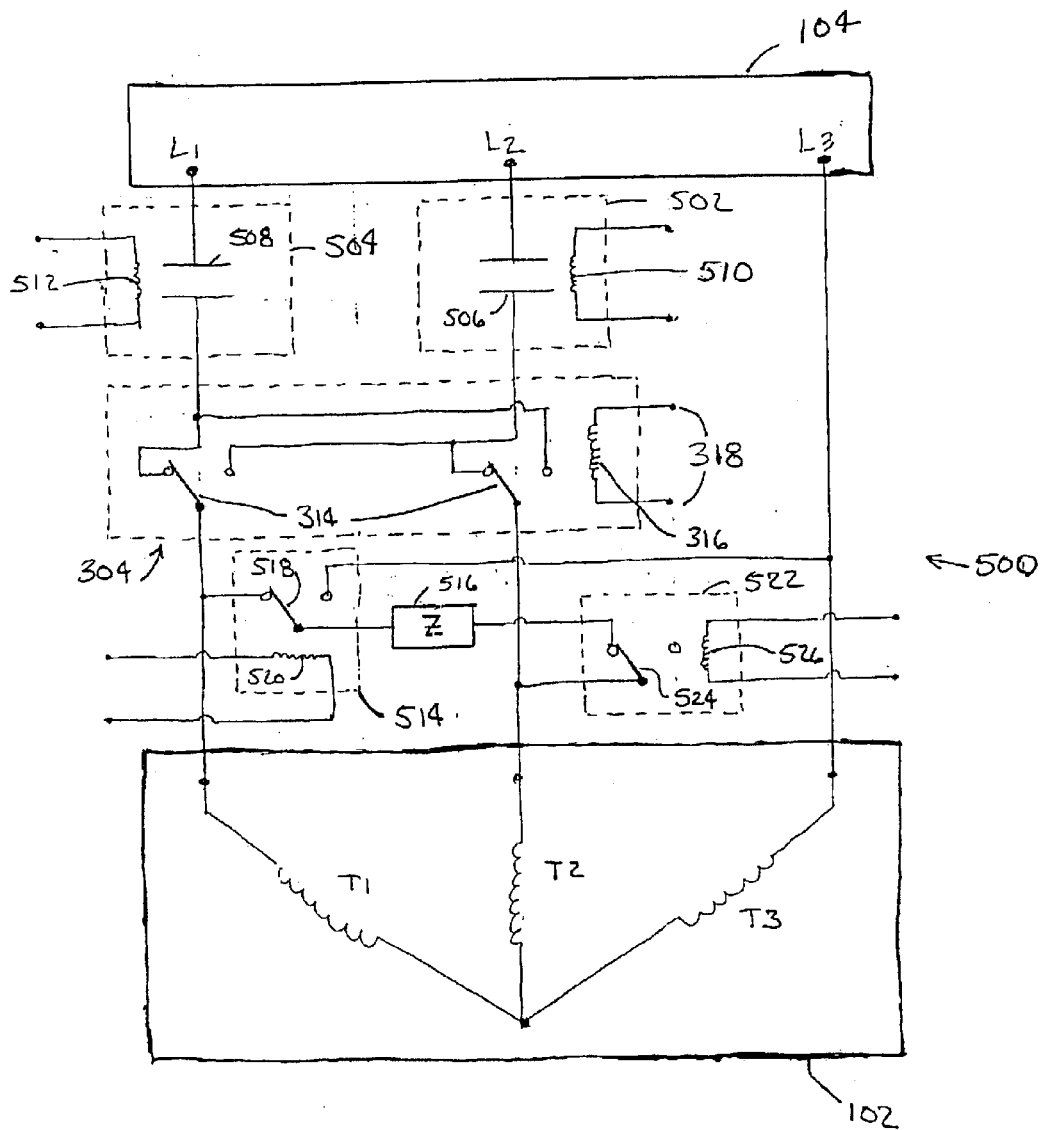
FIG. 5 is a circuit diagram of a fifth embodiment of the present invention for soft starting a three-phase motor.

FIG. 5 illustrates an embodiment of the present invention for soft starting a three phase motor. Starting circuit 500 can be used for soft starting a motor 102 driving a multi-capacity compressor having a high capacity state and a low capacity state such as the one described above with respect to FIG. 3. The starting circuit 500 can be used to soft start the motor 102 with the multi-capacity compressor in either the high capacity state or the low capacity state by providing a reduced in-rush current to motor windings T1–T3. Starting circuit 500 includes motor rotation control circuit 304 connected in series with two input lines to change the direction of rotation of the motor shaft, as described above with respect to FIG. 3. The DPDT switches 314 of the motor rotation control circuit 304 can be positioned in a first position for low capacity operation of the compressor and in a second position for high capacity operation of the compressor. Receipt of the appropriate motor rotation control signal at terminals 318 can energize the activation coil 316 to switch the poles of the DPDT switch 314 to the appropriate position for the desired direction of motor rotation and operating capacity of the compressor. FIG. 5 illustrates the DPDT switches 314 in the second position for high capacity starting of the motor 102 and multi-capacity compressor.

Two capacity circuits 502–504 are connected in series between the three phase power supply 104 and the motor rotation control circuit 304. Capacity circuits 502–504 include a switch or contact 506, 508 that is opened and closed by a corresponding activation coil 510, 512. For starting the motor 102 of the compressor while in low capacity state, only one switch or contact is closed. However, for starting the motor 102 of the compressor while in a high capacity state both switches or contacts 506, 508 are closed. Furthermore, both switches or contacts 506, 508 are closed during normal operation of the motor 102 and compressor, regardless of the operating capacity state of the compressor. For example, in the starting circuit 500 shown in FIG. 5, switch 506 is connected in series in input line L2 and is closed for both low capacity state starting and high capacity state starting. Switch 508 is connected in series in input line L1 and is closed for high capacity starting. Both switches 506, 508 are closed for normal operation of the motor 102 and compressor. The timing and operation of switches 506, 508 is dependent on the operating position provided for motor rotation control circuit 304. For example, the positioning of DPDT switches 314 for low capacity state operation would prevent the switch 508, the switch corresponding to the initiation of high capacity state operation, from being closed until normal operation of the motor 102 is desired.

Additionally, switching circuitry 514 can be used to connect an impedance load 516, which is preferably a capacitive load, across two input lines and their corresponding motor windings. Switching circuitry 514 includes a SPDT switch 518 actuated by an activation coil 520 to connect the impedance load 516 across two input lines for low capacity starting and to connect the impedance load 516 across two different input lines for high capacity starting. Connected in series with the impedance load 516 is load removal circuitry 522. Load removal circuitry 522 includes a SPDT switch 524 actuated by an activation coil 526. During startup of the motor 102, SPDT switch 524 is in a first position that completes the, connection of the impedance load 516 across the two input lines. However, when normal operation of the motor 102 is desired the SPDT switch 524 is positioned in the second position by activation coil 526 to remove or disconnect the impedance load 516 and permit full line power to be received by the motor 102. For example, in starting circuit 500 shown in FIG. 5, SPDT switch 518 connects impedance load 516 across input lines L2 and L3 for low capacity state starting and across input lines L1 and L2 for high capacity state starting.

The operation of starting circuit 500 will be provided in greater detail below with regard to a low capacity state starting of the motor 102 and compressor and a high capacity state starting of the motor 102 and the compressor. For a low capacity startup of motor 102, activation coil 510 closes contact or switch 506, however, activation coil 512 does not close contact or switch 508, thereby disabling input line L1. In about the same time frame as activation coil 510 closing switch or contact 506, activation coil 316 positions the DPDT switch into a position opposite to the one shown in FIG. 5 for a low capacity state starting of the motor 102. Also in about the same time frame as activation coil 510 closing switch or contact 506, activation coil 520 positions SPDT switch 518 into a position opposite the position shown in FIG. 5 and activation coil 526 positions SPDT switch 524 into the position shown in FIG. 5. This configuration of starting circuit 500 connects the impedance load 516 across motor windings T2 and T3 to reduce the in-rush current from input lines L2 and L3 to motor windings T2 and T3, thus, providing a soft start to motor 102 during low capacity operation of the compressor. After a predetermined time period has elapsed, which may be determined by a timing device 112, activation coil 512 closes switch or contact 508 and activation coil 526 positions SPDT switch 524 into a second position to remove impedance load 516, thereby permitting the motor 102 to begin normal operation. During normal operation of the motor 102 for low capacity operation of the compressor, starting circuit 500 is configured such that input line L1 is providing full line power to motor winding T1, input line L2 is providing full line power to motor winding T2, and input line L3 is providing full line power to motor winding T3.

For a high capacity state startup of motor 102, activation coil 510 closes contact or switch 506 and activation coil 512 closes contact or switch 508. In about the same time frame as activation coils 510 and 512 closing switches or contacts 506 and 508, activation coil 316 positions the DPDT switch into the position shown in FIG. 5 for high capacity state starting of motor 102. Also in about the same time frame as activation coils 510 and 512 closing switches or contacts 506 and 508, activation coil 520 positions SPDT switch 518 into the position shown in FIG. 5 and activation coil 526 positions SPDT switch 524 into the position shown in FIG. 5. This configuration of starting circuit 500 connects the impedance load 516 across motor windings T1 and T2 to reduce the in-rush current to motor windings T1 and T2 for soft starting motor 102 with the compressor in high capacity state of operation. After a predetermined time period has elapsed, activation coil 526 positions SPDT switch 524 into a second position to remove impedance load 516 and the motor 102 begins normal operation. During normal operation of the motor 102 for high capacity operation of the compressor, input line L1 is providing full line power to motor winding T2, input line L2 is providing full line power to motor winding T1, and input line L3 is providing full line power to motor winding T3.

Figure 6:
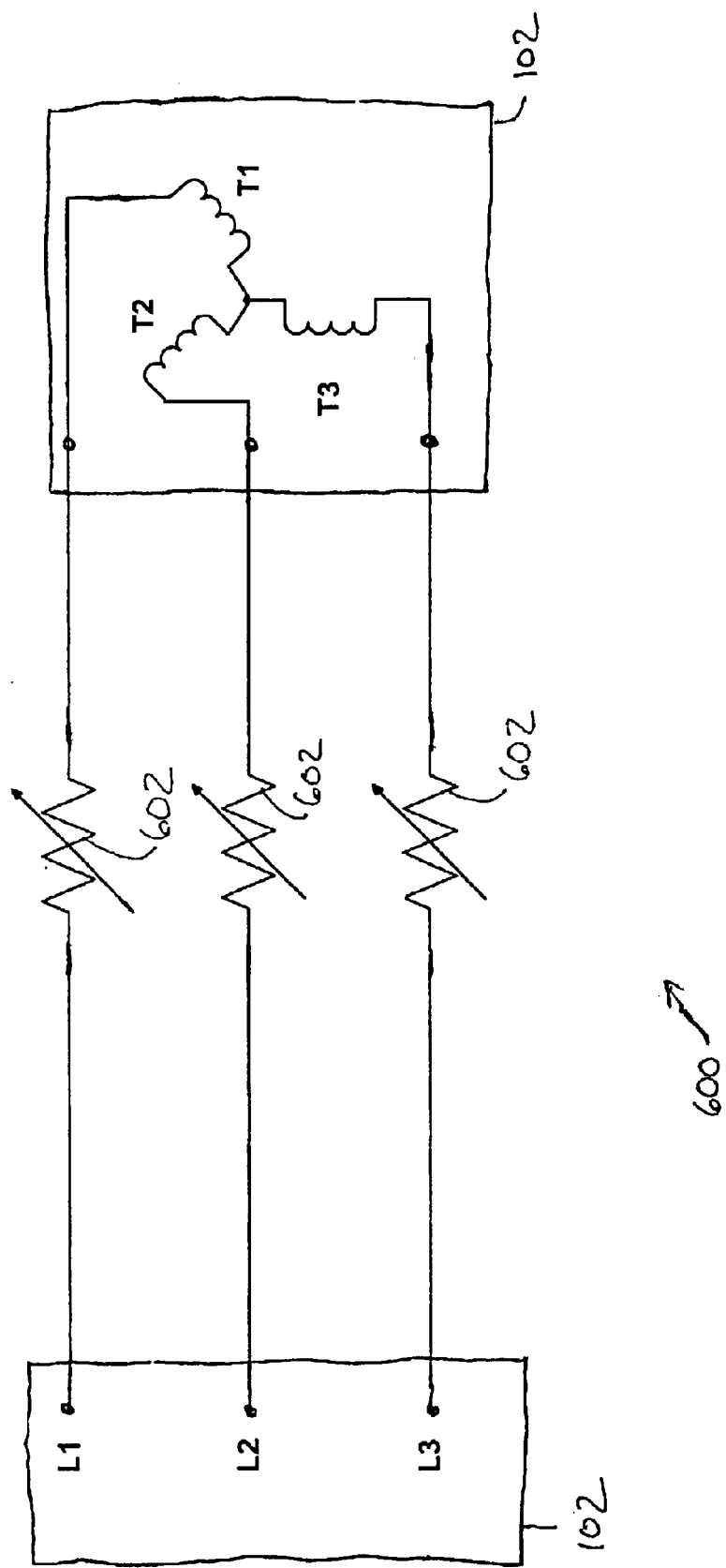
FIG. 6 is a circuit diagram of a sixth embodiment of the present invention for soft starting a three-phase motor.

FIG. 6 illustrates an embodiment of the present invention for soft starting a three phase motor. To achieve a soft start of motor 102, starting circuit 600 connects one or more variable resistance loads 602 in series with each of the motor windings T1–T3. The variable resistance load 602 is preferably a negative temperature coefficient (NTC) resistor. The NTC resistor 602 is configured to have a high starting resistance that decreases as the temperature of the resistor is increased from the flow of current through the resistor or from an external source. After a predetermined time period has elapsed, depending on the NTC resistor 602, the effective resistance of the NTC resistor 602 is negligible, thereby permitting full line power to be provided to the motor windings T1–T3. The high starting resistance of the NTC resistor 602 is used to reduce the in-rush current to motor windings T1–T3 at startup of the motor 102 and the decreasing resistive load of the NTC resistor 602 is used to subsequently provide full line power to the motor 102 after a predetermined time period has elapsed or expired so the motor 102 can begin normal operation. The predetermined time period associated with the NTC resistor 602 is based on the functional and operational characteristics of the resistor and a user can select an appropriate resistor to obtain a desired predetermined time period. The use of a NTC resistor 602 in starting circuit 600 generally alleviates the need for a timing device 112 and a switching device 108 in starting circuit 600 to remove or shunt the resistive load of the NTC resistor 602 from starting circuit 600, for normal operation of the motor 102. However, there can be an embodiment of the present invention where the NTC resistor may have to be shunted or removed after start.

In another embodiment of the present invention, the NTC resistors 602 of starting circuit 600 can be connected or used with less than all of the input lines L1–L3 and motor windings T1–T3. For example, an NTC resistor 602 may be connected in series with only motor winding T3 to provide the reduced in-rush current to the motor 102. In addition, a motor rotation control circuit 304 can be incorporated into starting circuit 600 to change the direction of rotation of the motor 102 in a multi-capacity compressor application. Similarly, motor rotation control circuit 304 can be incorporated or implemented in starting circuits 100, 200 for use in a multi-capacity compressor application.

It is to be understood that while the above description of the present invention was in the context of a three phase power supply and three phase motor, the present invention is equally applicable to power supplies and motors having a fewer number of phases, including single phase, and a greater number of phases. The present invention is intended to be applicable all multi-phase and single phase motors and power supplies.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A three phase motor for a multi-capacity compressor having a first capacity in response to a first direction of rotation of the motor and a second capacity greater than the first capacity in response to a second direction of rotation of the motor opposite to the first direction, the motor comprising:

a plurality of windings;
a circuit configured to provide an electrical connection between the plurality of windings and a plurality of input lines of a three phase power supply, the circuit comprising:
at least one impedance load connected in series with each winding of the plurality of windings upon startup of the three phase motor, the at least one impedance load connected in series with each winding being configured to receive power from an input line of a three phase power supply, the at least one impedance load connected in series with each winding being configured to provide a first amount of current to a corresponding winding of the plurality of windings upon startup of the three phase motor;
switching means, the switching means being configured and disposed to shunt out or remove the at least one impedance load connected in series with each winding for normal operation of the three phase motor upon expiration of a predetermined time period from startup of the three phase motor, the switching means being configured to provide a second amount of current to the plurality of windings for normal operation of the three phase motor; and
rotation control means, the rotation control means being configured and disposed to control the direction of rotation of the motor, the rotation control means having a first configuration to generate the first direction of rotation in the motor and a second configuration to generate the second direction of rotation in the motor, the rotation control means being switchable between the first configuration and the second configuration prior to startup of the three phase motor; and
a shaft, the shaft being configured to have a first acceleration in response to the first amount of current being provided to the plurality of windings and a second acceleration greater than the first acceleration in response to a second amount of current being provided to the plurality of windings, wherein the first acceleration of the shaft generates a reduced stop impact force on compressor components connected to the shaft during startup of the three phase motor over the second acceleration of the shaft, the stop impact force being generated from impact of compressor components against a corresponding stop of a multi-capacity compressor as a result of rotation of the shaft.

2. The three phase motor of claim 1 wherein the startup of the motor occurs after a switch from one configuration of the rotation control means to the other configuration of the rotation control means.

3. The three phase motor of claim 1 wherein the predetermined time period is in the range of about 100–300 ms.

4. The three phase motor of claim 1 wherein the switching means comprises a switching mechanism for each impedance load connected in series with each winding of the plurality of windings, each switching mechanism being configured and disposed to shunt out or remove a corresponding impedance load upon expiration of the predetermined time period.

5. The three phase motor of claim 4 wherein the switching means further comprises a timing device to determine the expiration of the predetermined time period.

6. The three phase motor of claim 5 wherein the switching means further comprises an activation mechanism connected to the timing device, wherein the activation mechanism is actuated to position each switching mechanism to shunt out or remove each impedance load in response to the timing device determining the expiration of the predetermined time period.

7. The three phase motor of claim 4 wherein each switching mechanism is connected in parallel with each corresponding impedance load.

8. The three phase motor of claim 4 wherein each switching mechanism is connected in series with each corresponding impedance load.

9. The three phase motor of claim 1 wherein the at least one impedance load comprises at least one resistive load.

10. The three phase motor of claim 9 wherein the at least one resistive load is about 10 Ohms.

11. The three phase motor of claim 1 wherein the at least one impedance load comprises at least one capacitive load.

12. The three phase motor of claim 1 wherein the at least one impedance load comprises at least one inductive load.

13. The three phase motor of claim 1 wherein the plurality of windings comprises three windings.

14. The three phase motor of claim 13 wherein the three windings are positioned in a wye configuration.

15. The three phase motor of claim 13 wherein the three windings are positioned in a delta configuration.

16. A method of starting a multi-capacity compressor to reduce impact forces on compressor components, the multi-capacity compressor having a first capacity in response to a first direction of rotation of a compressor motor and a second capacity greater than the first capacity in response to a second direction of rotation of the compressor motor opposite to the first direction, the method comprising the steps of:
  connecting at least one impedance load to at least one winding of the compressor motor using a first electrical path, the at least one impedance load being configured to provide a first amount of current to the at least one winding;
  accelerating a shaft of the multi-capacity compressor to a first speed of rotation corresponding to the first amount of current provided to the at least one winding;
  providing a second electrical path to the at least one winding of the compressor motor, the second electrical path being configured to provide a second amount of current greater than the first amount of current to the at least one winding of the compressor motor;
  switching from the first electrical path to the second electrical path after a predetermined time period has elapsed; and
  accelerating the shaft of the compressor motor to a second speed of rotation corresponding to the second amount of current provided to the at least one winding; and
  wherein the acceleration of the shaft to the first speed of rotation generates a reduced stop impact force on compressor components connected to the shaft over an acceleration of the shaft to the second speed of rotation, the stop impact force resulting from compressor components impacting a corresponding stop provided on the shaft.

17. The method of claim 16 further comprising the step of changing the direction of rotation of the compressor motor to obtain a different capacity of the multi-capacity compressor.

18. The method of claim 16 wherein the step of connecting at least one impedance load to at least one winding of the compressor motor further comprises the step of connecting at least one resistive load in series with at least one winding of the compressor motor.

19. The method of claim 16 wherein the step of connecting at least one impedance load to at least one winding of the compressor motor further comprises the step of connecting at least one capacitive load in series with at least one winding of the compressor motor.

20. The method of claim 16 wherein the step of connecting at least one impedance load to at least one winding of the compressor motor further comprises the step of connecting at least one inductive load in series with at least one winding of the compressor motor.

21. A motor for a multi-capacity compressor having a first capacity in response to a first direction of rotation of the motor and a second capacity greater than the first capacity in response to a second direction of rotation of the motor opposite to the first direction, the motor comprising:
  a plurality of windings;
  a circuit configured to provide an electrical connection between the plurality of windings and a plurality of input lines of a three phase power supply, the circuit comprising:
    at least one impedance load connected across two windings of the plurality of windings for startup of the motor, the at least one impedance load connected across two windings of the plurality of windings being configured to provide a first amount of current to the plurality of windings;
    a switching mechanism, the switching mechanism being configured and disposed to remove the at least one impedance load connected across two windings of the plurality of windings for normal operation of the motor in response to an expiration of a predetermined time period, the switching mechanism providing a second amount of current to the plurality of windings; and
    rotation control means, the rotation control means being configured and disposed to control the direction of rotation of the motor, the rotation control means having a first configuration to generate the first direction of rotation in the motor and a second configuration to generate the second direction of rotation in the motor, the rotation control means being switchable between the first configuration and the second configuration; and
  a shaft, the shaft being configured to have a first acceleration in response to a first amount of current being provided to the plurality of windings and a second acceleration greater than the first acceleration in response to a second amount of current being provided to the plurality of windings, wherein the first acceleration of the shaft generates a reduced stop impact force on components of a multi-capacity compressor connected to the shaft during startup of the three phase motor over the second acceleration of the shaft, the stop impact force being generated from components of a multi-capacity compressor impacting against a corresponding stop of a multi-capacity compressor as a result of rotation of the shaft.

22. The motor of claim 21 wherein:
  the plurality of windings comprises a first winding, a second winding and a third winding; and
  the circuit further comprises a second switching mechanism, the second switching mechanism having a first position to connect the at least one impedance load across the first winding and the second winding in response to the motor rotating in the first direction of rotation and a second position to connect the at least one impedance load across the third winding and the second winding in response to the motor rotating in the second direction of rotation, the second switching mechanism being switchable from the first position to the second position.

23. The motor of claim 22 wherein the circuit further comprises a third switching mechanism, the third switching mechanism having a first position providing an open circuit in at least two input lines of a plurality input lines, a second position providing a closed circuit for at least one input line in response to starting the motor in the first direction of rotation, and a third position providing a closed circuit for a plurality input lines in response to starting the motor in the second direction of rotation.

24. The motor of claim 23 wherein the third position of the third switching mechanism provides a closed circuit for a plurality of input lines in response to starting the motor in the second direction of rotation.

25. The motor of claim 22 wherein the startup of the motor occurs after a switch from one configuration of the rotation control means to the other configuration of the rotation control means.

26. The motor of claim 22 wherein the predetermined time period is in the range of about 100–300 ms.

27. The motor of claim 22 wherein the at least one impedance load comprises at least one capacitive load.

28. The motor of claim 22 wherein the three windings are positioned in a wye configuration.

29. The motor of claim 22 wherein the three windings are positioned in a delta configuration.

30. A motor for a multi-capacity compressor having a first capacity in response to a first direction of rotation of the motor and a second capacity greater than the first capacity in response to a second direction of rotation of the motor opposite to the first direction, the motor comprising:
a plurality of windings;
a circuit configured to provide an electrical connection between the plurality of windings and a plurality of input lines of a power supply, the circuit comprising:
at least one negative temperature coefficient resistive load connected in series with each winding of the plurality of windings for startup of the motor, the at least one negative temperature coefficient resistive load connected in series with each winding being configured to receive power from an input line of a power supply, the at least one negative temperature coefficient resistive load connected in series with each winding being configured to provide a first amount of current to a corresponding winding of the plurality of windings at startup of the motor and the at least one negative temperature coefficient resistive load being configured to provide a second amount current greater than the first amount of current to a corresponding winding of the plurality of windings for normal operation of the motor upon expiration of a predetermined time period;
a rotation control assembly, the rotation control assembly being configured and disposed to control the direction of rotation of the motor, the rotation control assembly having a first configuration to generate the first direction of rotation in the motor and a second configuration to generate the second direction of rotation in the motor, the rotation control assembly being switchable between the first configuration and the second configuration; and
a shaft, the shaft being configured to have a first acceleration during startup of the motor in response to a first amount of current being provided to the plurality of windings and a second acceleration greater than the first acceleration during normal operation of the motor in response to a second amount of current being provided to the plurality of windings, wherein the first acceleration of the shaft generates a reduced stop impact force on components of a multi-capacity compressor connected to the shaft during startup of the three phase motor over the second acceleration of the shaft, the stop impact force being generated from components of a multi-capacity compressor impacting against a corresponding stop of a multi-capacity compressor as a result of rotation of the shaft upon startup of the motor.

31. The motor of claim 30 wherein the startup of the motor occurs in response to a switch from one configuration of the rotation control means to the other configuration of the rotation control assembly.

32. The motor of claim 22 wherein the at least one negative temperature coefficient resistive load is heated by flowing electrical current through the at least one negative temperature coefficient resistive load.

33. A multi-capacity compressor having a first operating capacity and a second operating capacity, the second operating capacity being greater than the first operating capacity, the multi-capacity compressor comprising:
a three phase motor, the three phase motor having a first direction of rotation and a second direction of rotation opposite to the first direction of rotation, the first direction of rotation of the three phase motor generating the first operating capacity in the multi-capacity compressor and the second direction of rotation of the three phase motor generating the second operating capacity in the multi-capacity compressor, and the three phase motor comprising a plurality of windings;
a shaft connected to the three phase motor and having a first direction of rotation corresponding to the first direction of rotation of the three phase motor and a second direction of rotation corresponding to the second direction of rotation of the three phase motor;
a plurality of eccentric crankpins disposed on the shaft, each eccentric crankpin being configured and disposed to drive an associated piston;
at least one stop mechanism disposed on the shaft, the at least one stop mechanism being disposed, adjacent to an eccentric crankpin of the plurality of eccentric crankpins;
an eccentric cam disposed about an eccentric crankpin of the plurality of eccentric crankpins, the eccentric cam comprising at least one dog configured and disposed to contact said at least one stop mechanism, the eccentric cam and at least one dog having a first position with respect to the at least one stop mechanism in response to the first direction of rotation of the shaft and a second position with respect to the at least one stop mechanism different from the first position in response to the second direction of rotation of the shaft;
a circuit configured to provide an electrical connection between the plurality of windings and a plurality of input lines of a three phase power supply, the circuit comprising:
at least one impedance load connected in series with each winding of the plurality of windings upon startup of the three phase motor, the at least one impedance load connected in series with each winding being configured to receive power from an input line of a three phase power supply, the at least one impedance load connected in series with each winding being configured to provide a first amount of current to a corresponding winding of the plurality of windings;

a switching mechanism, the switching mechanism being configured and disposed to shunt out or remove the at least one impedance load connected in series with each winding for regular operation of the three phase motor upon expiration of a predetermined time period, the switching mechanism providing a second amount of current to the plurality of windings; and a rotation control mechanism, the rotation control mechanism being configured and disposed to control the direction of rotation of the motor, the rotation control mechanism having a first configuration to generate the first direction of rotation in the three phase motor and a second configuration to generate the second direction of rotation in the three phase motor, the rotation control mechanism being switchable between the first configuration and the second configuration; and wherein the shaft having a first acceleration during startup of the three phase motor in response to a first amount of current being provided to the plurality of windings and a second acceleration greater than the first acceleration during regular operation of the three phase motor in response to a second amount of current being provided to the plurality of windings, the first acceleration of the shaft generating a reduced stop impact force upon the at least one dog contacting the corresponding at least one stop mechanism in response to a change in the direction of rotation of the three phase motor over the second acceleration of the shaft.

* * * * *